M. G. CHESS.
FOOD TRAY.
APPLICATION FILED SEPT. 19, 1919.
1,351,285.
Patented Aug. 31, 1920.
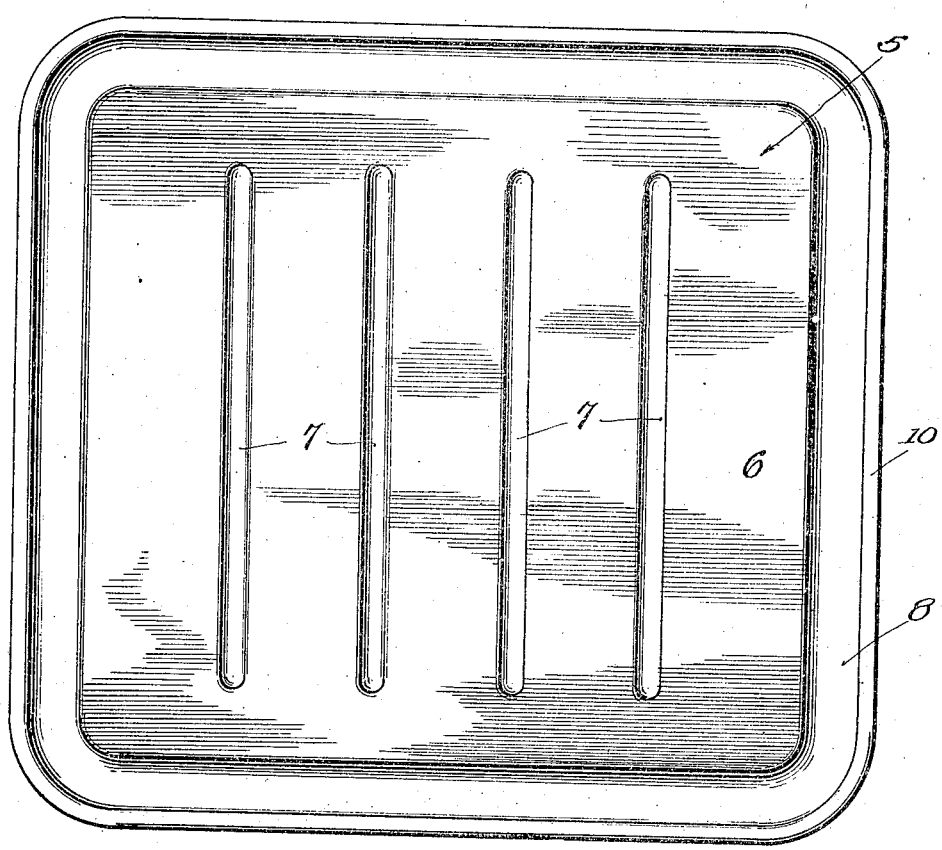
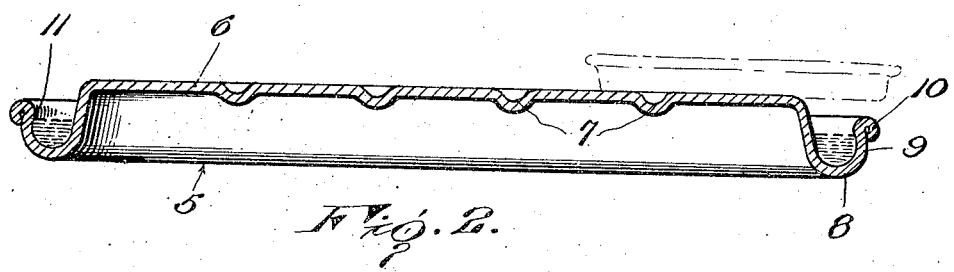
Inventor
M. G. Chess.

UNITED STATES PATENT OFFICE.

MATTIE G. CHESS, OF OAKLAND, CALIFORNIA.

FOOD-TRAY.

1,351,285.  Specification of Letters Patent.  Patented Aug. 31, 1920.

Application filed September 19, 1919. Serial No. 324,858.

*To all whom it may concern:*

Be it known that I, MATTIE G. CHESS, a citizen of the United States, residing at Oakland, in the county of Alameda and State of California, have invented certain new and useful Improvements in Food-Trays, of which the following is a specification.

This invention relates to improvements in food trays having novel means for preventing ants from gaining access to food carried by the tray.

An important object of this invention is to provide a food tray having a liquid trough arranged about its edges whereby the ants are prevented from crawling to the upper side of the tray and attacking food which may be mounted on the tray.

A further object of the invention is to provide a food tray having a continuous trough about its outer side, the outer side of said trough being spaced below the plane of the tray so that ants cannot crawl from the outer side of the trough to any dishes which may project beyond the side of the tray.

A further object of the invention is to provide a food tray having a depending trough arranged about its sides for spacing the tray proper, upwardly from a table whereby hot dishes carried by the tray will be prevented from burning the table.

A further object of the invention is to provide a food tray having a depending trough arranged about its sides and adapted to function as a handle for carrying the tray.

A further object of the invention is to provide a food tray which is cheap to manufacture of highly simplified construction and efficient in use.

Other objects and advantages of the invention will be apparent during the course of the following description.

In the drawing forming a part of this application and in which like numerals are employed to designate like parts throughout the same, Figure 1 is a plan view of a trough embodying my invention, Fig. 2 is a vertical transverse section through the same.

In the drawing wherein for the purpose of illustration is shown a preferred embodiment of my invention, the numeral 5 generally designates my improved tray which is adapted to be stamped from a single piece of sheet metal such as pressed steel or the like. The body 6 of the tray may be of any desired shape and is provided with a plurality of spaced parallel corrugations 7 adapted to strengthen the tray whereby the same will be enabled to support articles of considerable weight. The corrugations 7 also serve as a means for retaining the drippings from the food carried by the dish mounted upon the tray.

As illustrated in Fig. 2 a trough 8 is arranged about the tray and is provided by bending or stamping the end portions of the tray. The trough 8 is approximately U shaped in cross section and has its outer side 9 provided with a rolled or beaded upper edge 10. The rolled edge 10 of the trough provides a smooth edge which prevents the trough from cutting into the hands when picking up the tray. As illustrated in detail in Fig. 2, the upper edge of the outer side 9 of the trough is bent inwardly slightly, as indicated at 11, for preventing the water or other liquid within the trough from splashing out of the trough.

It will be noted that the upper edge of the outer side 9 of the trough is disposed below the plane of the tray so that it is impossible for ants or other insects to crawl from the upper edge of the outer side 9 to any dishes or other receptacles which may be mounted on the tray in the event that said dishes extend beyond the side of the tray.

The trough 8 also spaces the body of the tray from a table or other support on which the tray is mounted so that in the event that the dishes on the tray are heated, the table will not be burned.

The rounded trough also serves as a handle for carrying the tray.

It is to be understood that the form of the invention herewith shown and described is to be taken as the preferred example of the same and that such minor changes and arrangement in the construction of parts may be made as will remain within the spirit of the invention and the scope of what is claimed.

Having thus described the invention, what is claimed as new is:

A pressed metal article of manufacture comprising a sheet metal blank formed into a tray having a raised food platform provided with depressed reinforcing corrugations constituting essence receiving means, the edges of the blank being turned upwardly to provide an insecticide trough below the level of the food platform whereby insects are prevented from crawling from the outer side of the trough to dishes mounted upon the platform and projecting beyond the same.

In testimony whereof I affix my signature.

MATTIE G. CHESS. [L. S.]